US010984081B2

(12) United States Patent
Goeringer et al.

(10) Patent No.: US 10,984,081 B2
(45) Date of Patent: Apr. 20, 2021

(54) SYSTEMS AND METHODS FOR SECURE PERSON TO DEVICE ASSOCIATION

(71) Applicant: CABLE TELEVISION LABORATORIES, INC, Louisville, CO (US)

(72) Inventors: Steven John Goeringer, Westminster, CO (US); Brian Alexander Scriber, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 271 days.

(21) Appl. No.: 15/722,273

(22) Filed: Oct. 2, 2017

(65) Prior Publication Data

US 2018/0096121 A1    Apr. 5, 2018

Related U.S. Application Data

(60) Provisional application No. 62/402,264, filed on Sep. 30, 2016.

(51) Int. Cl.
*G06F 21/32* (2013.01)
*H04L 9/06* (2006.01)
(Continued)

(52) U.S. Cl.
CPC ............ *G06F 21/32* (2013.01); *G06F 21/316* (2013.01); *G06F 21/445* (2013.01); *G06F 21/64* (2013.01);
(Continued)

(58) Field of Classification Search
CPC ...... G06F 21/10; G06F 21/316; G06F 21/445; G06F 21/64; G06Q 20/389; H04L 9/0637; H04L 9/3239; H04L 9/3263
See application file for complete search history.

(56) References Cited

U.S. PATENT DOCUMENTS

| 7,260,480 B1* | 8/2007 | Brown | G06F 19/324 |
| | | | 702/19 |
| 2008/0059237 A1* | 3/2008 | Koren | G06Q 50/24 |
| | | | 705/3 |

(Continued)

OTHER PUBLICATIONS

Triantafyllidis, Nikolaos P., "Developing an Ethereum Blockchain Application", Feb. 19, 2016, University of Amsterdam, System & Network Engineering MSc. (Year: 2016).*

*Primary Examiner* — Tongoc Tran
(74) *Attorney, Agent, or Firm* — Armstrong Teasdale LLP

(57) ABSTRACT

An association management system for establishing, maintaining, and monitoring associations between a personal identifier and an electronic device, includes a provider subsystem in operable communication with at least one of the personal identifier and the electronic device. The provider subsystem is configured to provision a person associated with the personal identifier, authenticate both of the personal identifier and the electronic device, and establish an association of the authenticated personal identifier to the authenticated electronic device. The system further includes a certificate authority subsystem for issuing at least one digital certificate to verify an identity of one or more digital entities operating on the management system, and a digital distributed ledger including a plurality of a consensus pool of participating processors. The digital distributed ledger is configured to verify, using the at least one digital certificate, transaction events of the association management system.

19 Claims, 2 Drawing Sheets

(51) Int. Cl.
*G06F 21/44* (2013.01)
*G06F 21/31* (2013.01)
*G06F 21/64* (2013.01)
*H04L 9/32* (2006.01)

(52) U.S. Cl.
CPC .......... H04L 9/0637 (2013.01); H04L 9/3239 (2013.01); H04L 9/3263 (2013.01); *H04L 2209/38* (2013.01); *H04L 2209/56* (2013.01)

(56) References Cited

U.S. PATENT DOCUMENTS

| | | | |
|---|---|---|---|
| 2014/0344015 A1* | 11/2014 | Puertolas-Montanes | G06Q 20/10 705/7.29 |
| 2015/0332283 A1* | 11/2015 | Witchey | G06Q 30/018 705/3 |
| 2017/0048216 A1* | 2/2017 | Chow | G06Q 20/0655 |
| 2017/0214675 A1* | 7/2017 | Johnsrud | H04L 63/08 |
| 2017/0243193 A1* | 8/2017 | Manian | G06Q 20/3829 |
| 2017/0251933 A1* | 9/2017 | Braun | A61B 5/117 |
| 2017/0295023 A1* | 10/2017 | Madhavan | H04L 9/3247 |
| 2017/0300898 A1* | 10/2017 | Campero | H04L 9/3236 |
| 2018/0040040 A1* | 2/2018 | Barski | G06Q 30/0601 |
| 2018/0089641 A1* | 3/2018 | Chan | G06Q 20/0655 |
| 2018/0089655 A1* | 3/2018 | McDonald | G06Q 20/02 |
| 2019/0020648 A1* | 1/2019 | Haque | H04L 63/0823 |
| 2019/0199535 A1* | 6/2019 | Falk | H04L 9/3268 |
| 2019/0287095 A1* | 9/2019 | Gaddam | G06Q 20/356 |

* cited by examiner

SYSTEMS AND METHODS FOR SECURE PERSON TO DEVICE ASSOCIATION

CROSS REFERENCE TO RELATED APPLICATIONS

This application claims the benefit of and priority to U.S. Provisional Patent Application Ser. No. 62/402,264, filed Sep. 30, 2016, the disclosure of which is herein incorporated by reference in its entirety.

BACKGROUND

The field of the disclosure relates generally to device association security, and more particularly, to device to person association using distributed ledger technology.

A variety of devices interact with people. Often, details of what devices are used, by specific people, and at specific times, are important to know and verify. For example, for insurance and safety reasons, it may be very important to know details about critical medical devices associated with specific patients. In law enforcement examples, it is often important to verify details of certain devices (such as body cameras) associated with particular law enforcement officer persons, whether for evidentiary or for safety reasons. Unlawful activities, such as insurance fraud, malpractice, and/or other criminal or unethical practices, provide significant incentives to falsify records associating devices to people, and other data associated therewith (e.g., timestamps, geolocations, etc.). Conventional systems and methods, which rely on manual processes augmented by traditional databases, do not provide sufficient transparency and visibility to confidently verify that a specific device was assigned or being used by a specific person at a specific time and in a specific location.

Moreover, communication with associated devices is often performed as data transactions over a network that is not considered to be secure. Conventional transaction security solutions can be extremely complex, and conventional mechanisms for transaction security are increasingly being exploited. For example, where conventional systems employ multiple security measures for a transaction, it is difficult to verify whether the transaction itself has been compromised, or when the compromise occurred, once one security measure has been breached.

BRIEF SUMMARY

In an embodiment, an association management system is provided for establishing, maintaining, and monitoring associations between a personal identifier and an electronic device. The system includes a provider subsystem in operable communication with at least one of the personal identifier and the electronic device. The provider subsystem is configured to provision a person associated with the personal identifier, authenticate both of the personal identifier and the electronic device, and establish an association of the authenticated personal identifier to the authenticated electronic device. The system further includes a certificate authority subsystem for issuing at least one digital certificate to verify an identity of one or more digital entities operating on the management system, and a digital distributed ledger including a plurality of a consensus pool of participating processors. The digital distributed ledger is configured to verify, using the at least one digital certificate, transaction events of the association management system.

In another aspect, a method of establishing and managing an association of an electronic device to a person is provided. The method implements an electronic certificate authority and a digital distributed ledger having a plurality of participating processors over a distributed network. The method includes a step of initiating a digitally signed genesis transaction for the electronic device to the plurality of participating processors for consensus verification. The consensus verification includes validating a digital signature of the genesis transaction with the certificate authority. The method also includes steps of configuring, after consensus verification of the genesis block transaction, the electronic device to have a status indicating availability of the configured device for use, and associating the available electronic device with a personal identifier of the person. The association includes validation, by the participating processors checking the digital signature with the electronic certificate authority, of the availability status of the configured device. The method also includes steps of recording, onto the digital distributed ledger, operational details of the association of the available electronic device with the personal identifier, and monitoring a use of the associated electronic device over time. The monitoring includes tracking changes to one or more of the operational details of the association. The method also includes a step of validating, by the participating processors checking the digital signature with the electronic certificate authority, a change to the one or more operational parameters, and recording information of the change on the digital distributed ledger.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
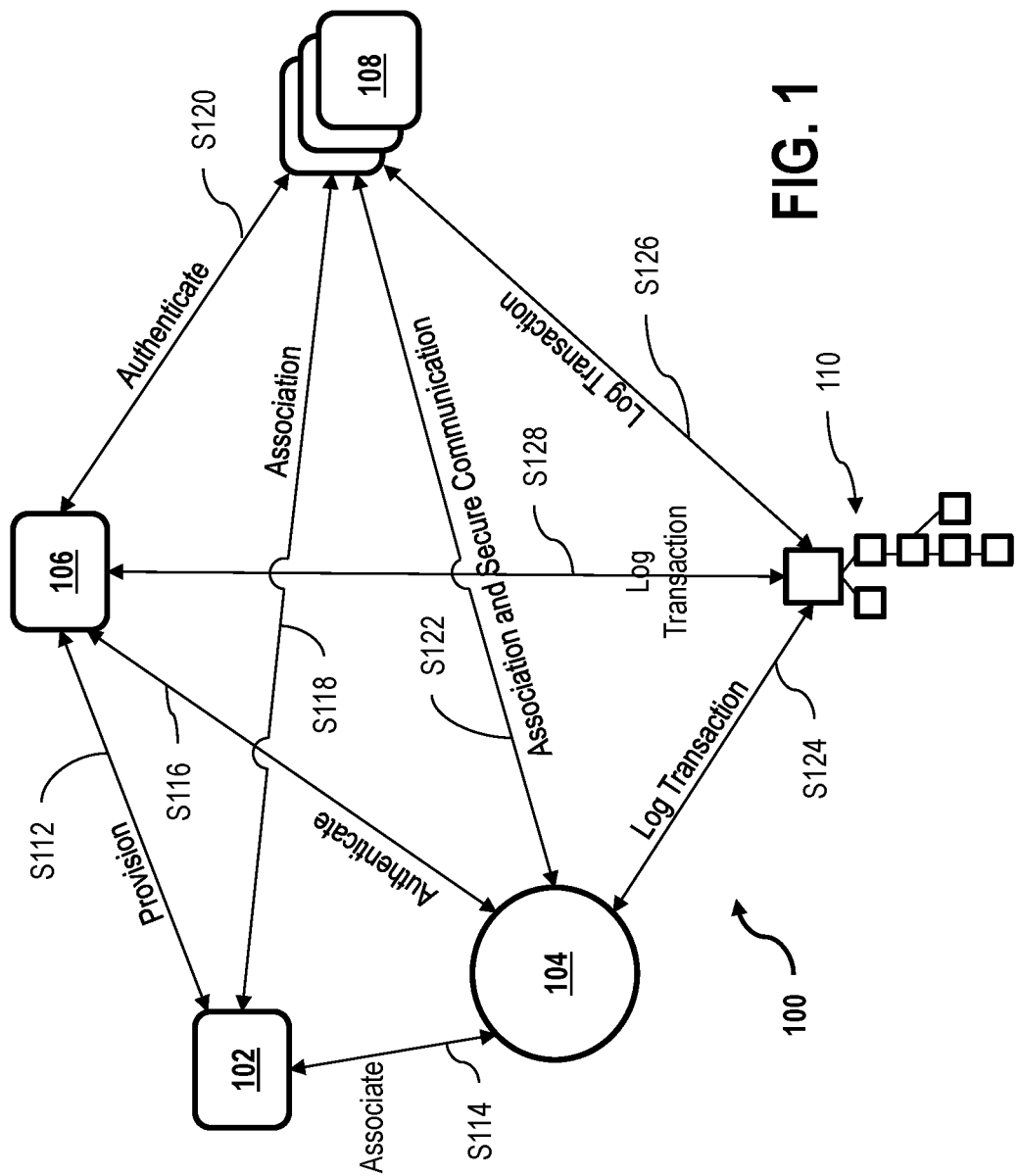
FIG. 1 is a schematic illustration of an exemplary device association management system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The present systems and methods herein advantageously utilize distributed ledgers to confirm and/or record the status of electronic devices, as well as the associations and association events of electronic devices to persons. The present embodiments may be implemented to replace or augment conventional security practices that rely on trusted parties to manually record events into databases or other record keeping mechanisms, such as trusted labels or tags, including bar codes, RFID tags, or other device identification methods. The distributed ledgers described and illustrated herein may include, for example, blockchain technology to create digital ledgers for tracking the state of associations between people and devices. For ease of explanation, the following description references blockchains as an exemplary embodiment of distributed ledger technology. A person of ordinary skill in the art though, upon reading and comprehending the present description and associated illustrations, will understand that other examples of distributed ledger technologies may be implemented according to the novel and advantageous principles herein.

That is, in the following disclosure, the phrases "distributed ledger" and "blockchain" are used. In conventional practice literature, these two concepts are often considered to be synonymous. However, within this application, the two concepts may be considered to differ with respect to their use and implementation. For example, in some instances the phrase "distributed ledger" may refer to how the ledger or blockchain is used, namely, the accessible distributed ledger as available to prove the facts of a transaction by virtue of being distributed amongst participating electronic processors of a consensus pool. A "blockchain," on the other hand, may refer to the process by which the distributed ledger is created and operated. Accordingly, a blockchain will create a distributed ledger, but a distributed ledger is not limited to only blockchains. In the following description, the phrase "digital ledger" is utilized two referred to either or both of the distributed ledger and the blockchain.

The present solutions are thus advantageously implemented as either standalone systems, or as complementary systems to conventional recording systems, where it is important to verify information (e.g., specific times, location, duration, etc.) from an association of (i) a person to an electronic device, (ii) a device to a different device, or (iii) a person to another person. The present embodiments are therefore of particular application to fields such as medicine (e.g., medical devices tracking a patient's vital statistics), law enforcement (e.g., body cameras, vehicle dash-cams, and weapons, including weapon usages/discharges and location or handling tracking, etc.), lending services, car rental services, etc. In some embodiments, distributed ledger or blockchain registration may be implemented together with conventional identification and authentication processes, such as bar code scanning, RFID tagging, near field communications, biometrics, manual entries, etc.

In an exemplary embodiment, the distributed ledger is a blockchain. Blockchaining technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained. Exemplary systems and methods of blockchain technology are described in greater detail in co-pending U.S. patent application Ser. No. 15/345,411, filed Nov. 7, 2016, U.S. patent application Ser. No. 15/376,375, filed Dec. 12, 2016, U.S. patent application Ser. No. 15/476,111, filed Mar. 31, 2017, and U.S. patent application Ser. No. 15/476,098, filed Mar. 31, 2017, all of which are incorporated by reference herein.

In the following embodiments, digital ledgers are utilized and/or created to track the state of associations between persons and electronic devices. In an exemplary embodiment, the digital ledger is implemented to reliably record the status of the device, as well as device-to-person association events. According to the advantageous systems and methods described herein, the digital ledger may be utilized to automatically supplement, or substitute for, conventional practices that rely on trusted parties to manually record events into databases or other electronic record keeping mechanisms. In some embodiments, the present systems and methods utilize their own unique device technology to identify a person for association with one or more devices. In other embodiments, the present systems and methods may be implemented utilizing existing trusted identification technology, such as barcodes, RFID tags, biometric identifiers, etc.

The embodiments described herein are particularly useful for reliably associating critical devices with a particular person in the fields of medicine and law enforcement, for example. As described herein, details of transaction events (i.e., a change in status) for a particular electronic device (e.g., medical equipment, personal or vehicle audio/video recorder, automobile, GPS technology, firearm or taser) are encoded into a cryptographically signed and protected transaction that is submitted to a distributed ledger network, such as a blockchain network, for further processing. The distributed network processes the incoming transactions into blocks, which may then be added to a particular blockchain. Once added to the blockchain (or equivalent entry in an electronic distributed ledger), the transaction is visible to, but immutable by, appropriate parties that seek to create a history of person-to-device associations for the particular device and/or person(s) to which the device may be associated. Such histories may then be more easily verified, but rendered more difficult to alter.

FIG. 1 is a schematic illustration of an exemplary device association management system 100 for establishing and managing a person-to-device association. In an exemplary embodiment, system 100 includes a provider subsystem 102, a personal identification unit 104, a certificate authority 106, one or more electronic devices 108, and digital ledger 110. Provider subsystem 102 is, for example, a hospital or medical facility electronic network, or a central office/station for law enforcement personnel, a rental car company, or another entity responsible for provisioning and distributing electronic devices. In the exemplary embodiment, personal identification unit 104 is worn by, or in close proximity to, the person with which electronic device 108 is to be associated, and may include, for example, one or more of a trackable ID, such as an RFID tag, a secure barcode (e.g., patient wristband, pharmacist tag, etc.), a biometric electronic device, a geo.Chip or other GPS technology, or another type of trackable tag utilizing near field communication (NFC) technology. In an alternative embodiment, the personal identification unit comprises a biometric identifier (e.g., fingerprint, iris image, signature, facial recognition data, etc.) capable of being read or tracked by a biometric scanner (not separately shown) of, or in operable communication with, the electronic device. In some embodiments, the biometric scanner is in close physical proximity to the person during device operation.

Also in an exemplary embodiment, certificate authority 106 is a trusted entity that issues electronic documents/digital certificates that verify the identity of a digital entity on the Internet or comparable electronic network. The digital certificates may, for example, be implemented according to secure communication techniques such as a conventional public key infrastructure (PKI). In the exemplary embodiment, electronic device 108 includes its own memory and processor (not shown), and is capable of wired or wireless electronic communication over the Internet. Alternatively, or additionally, electronic device 108 includes a trackable ID or tag similar to personal identification unit 104, which may be periodically detected and read by a separate electronic device having a processor and memory, and electronic/Internet communication capability.

In operation, management system 100 functions to provision persons, authenticate devices and persons, associate devices with persons and/or providers, and track the associations thereby established through continuous authentication and reputation management secured by an immutable digital ledger. The following exemplary implementation of system 100 is described with respect to medical applications. Nevertheless, a person of ordinary skill in the art will understand, upon reading and comprehending the present application, how the principles of system 100 apply to other fields (e.g., law enforcement) where securing and tracking the association of a device to a person is important.

In the exemplary embodiment described with respect to FIG. 1, provider subsystem 102 is a medical facility network, and in operable communication with certificate authority 106 (e.g., Internet, LAN, WAN, etc.). In step S112, provider subsystem 102 provisions a patient (not separately shown) with certificate authority 106. In an example of step S112, certificate authority 106 verifies the identity of provider subsystem 102 using a public key, and issues a digital certificate to provider subsystem 102 using a private key. The issued digital certificate thereby becomes a trusted root certificate, which may then be embedded in hardware or software of the several separate components/entities within management system 100. Upon receipt of the digital certificate, provider subsystem 102 provisions the patient, and, in step S114, associates personal identification unit 104, or patient ID 104, to a record of the patient stored within provider subsystem 102, as well as relevant network IDs of provider subsystem 102. In step S116 certificate authority 106 authenticates the association of patient ID 104 established in step S114. In an exemplary embodiment, PKI-based certificates are utilized to implement secure communication and authentication.

In the exemplary embodiment, provider subsystem 102 provisions and associates one or more electronic devices 108 in a manner similar to the provisioning the association of patient ID 104. In this example, provider subsystem 102 separately performs provisioning step S112 with respect to the at least one electronic device 108 (e.g., a medical device), and utilizes the digital certificate to provision medical device 108, and, in step S118, associates medical device 108 with provider subsystem 102 and the medical record of the patient stored therein. In step S120, certificate authority 106 authenticates the association of medical device 108 established in step S118. After both patient ID 104 and medical device 108 authenticated, in step S122, medical device 108 is associated with patient ID 104, and a secure communication channel is established therebetween within management system 100. In at least one embodiment, additional medical devices 108 (e.g., telemetry units, infusion pumps, etc.) may be similarly associated with patient ID 104. In alternative embodiments, different modes of authentication and secure communication may be established between patients and individual electronic devices without departing from the scope of the embodiments described herein.

In the exemplary operation described above, each provisioning, authentication, and association may establish its own transaction event, and, in steps S124, S126, and S128, each of such transaction events may be logged into digital ledger 110 by one or more of patient ID 104, medical device 108, and certificate authority 106, respectively. In an alternative embodiment, patient ID 104 is continuously monitored by provider subsystem 102, and provider subsystem 102 logs transaction events thereof (e.g., step S124). In further exemplary operation, management system 100 continuously monitors the respective associations and secure communication channels, tracks any status changes thereof as separate transaction events, and logs each such transaction event (e.g., steps S124, S126, S128) to digital ledger 110. Where digital ledger 110 is a blockchain, logging of a transaction event may be accomplished by adding a block to the blockchain. In at least one embodiment, particular transaction events are alarmed, that is, the loss or interruption of the association/secure communication (such as might occur when the patient removes patient ID 104) will trigger an alert or notification to provider subsystem 102 for remediation.

In an embodiment, management system 100 is further configured to monitor, measure, and determine a system reputation. Reputation may be measured, for example, according to the number of event transactions logged to digital ledger 110. In this example, few or no transaction events (i.e., no status changes) may indicate a high level of assurance, where as a relatively high number of transaction events may indicate a low level of assurance, where the system reputation is thus based upon these relative assurance levels. In an exemplary embodiment, management system 100 is configured to repeat one or both of authentication steps S116, S120 to assure that all relevant associations are correct and properly maintained. In at least one embodiment, the authentication steps S116, S120 are repeated automatically on a periodic basis.

Figure 2:
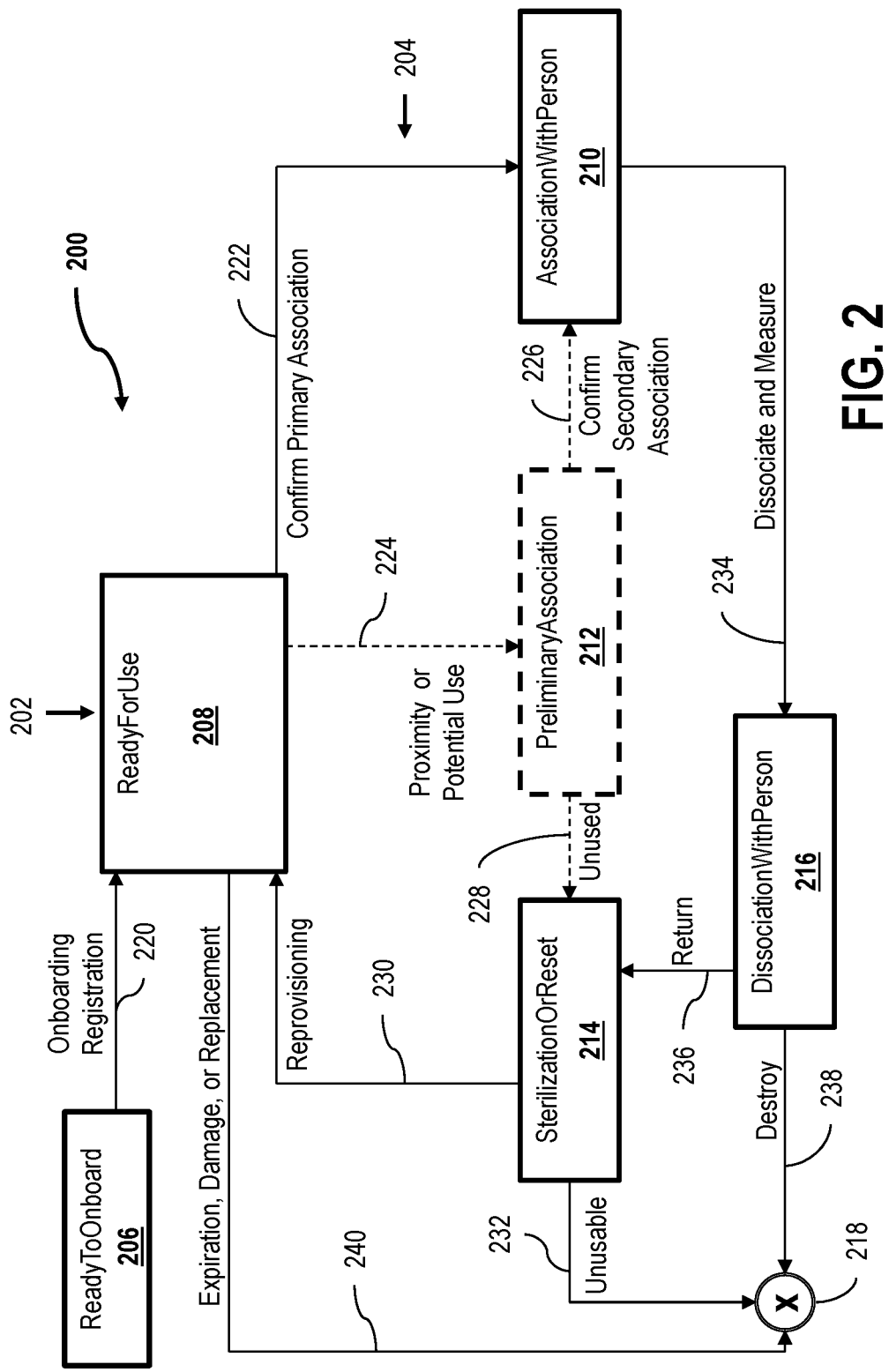
FIG. 2 is a schematic illustration of a distributed ledger virtualization for establishing and managing the association of the device depicted in FIG. 1.

FIG. 2 is a schematic illustration of a distributed ledger virtualization 200 for establishing and managing the association of electronic device 108 with a person (i.e., personal identification unit 104) of system 100, FIG. 1, utilizing digital ledger 110. Virtualization 200 is illustrated as an exemplary architecture to implement the distributed ledger embodiments of the present disclosure. Other architectures are contemplated by the present inventors, which do not depart from the scope of the embodiments. Furthermore, for ease of explanation, redundant components in virtualization 200 are not illustrated, nor are link level objects/implementations, security authentication objects/sequences/implementations or other components that are conventionally utilized in a distributed ledger network for communication, availability, or security purposes. In an exemplary embodiment of virtualization 200, transaction events are communicated by nodes respectively associated with one or more of the elements from system 100.

In the exemplary embodiment described with respect to virtualization 200, digital ledger 110 is a blockchain, and virtualization 200 leverages digital signatures (i.e., hashing) and Merkle roots/trees to securely associate a particular person with a particular device, and then reliably monitor and track the association using the blockchain. Virtualization 200 is described herein primarily with respect to the interaction of the digital ledger, and is not intended to describe all other potential processing steps performed by persons (e.g., manual entries) or other devices (e.g., data transmissions, communication protocols, etc.) that may also be performed or implemented, as described above, in a complementary fashion with virtualization 200.

In an exemplary embodiment of virtualization 200, device 108 is configurable between a plurality of different states, or statuses, 202 according to a plurality of different transactions, or programmable steps, 204. In the exemplary embodiment, states 202 include one or more of ReadyToOnboard state 206, ReadyForUse state 208, AssociationWithPerson state 210, PreliminaryAssociation state 212, SterilizationOrReset state 214, DissassociationWithPerson state 216, and Destruct state 218. In the exemplary embodiment, device 108 is pre-set (e.g., by the device manufacturer) to ReadyToOnboard state 206 prior to use, and all transactions 204 are submitted to digital ledger 110, FIG. 1 (e.g., step S126), as transaction events, described above.

In exemplary use, an Onboarding Registration transaction 220 is generated for device 108 and submitted digital ledger 110. In an exemplary embodiment, where digital ledger 110 is a blockchain, Onboarding Registration transaction 220 is a genesis transaction that is submitted to blockchain processors (not shown) of the blockchain 110 as a transaction event. Genesis transaction 220 includes information and detail sufficient to authentically identify device 108, as well as particular characteristics necessary to correctly associate device 108 with personal identification unit 104, which is associated with a particular person, or persons, for use according to the device's intended purpose. Genesis transaction 220 is digitally signed, and thus enables subsequent state transitions between states 202. In the exemplary embodiment, once genesis transaction 220 is submitted to the blockchain processors of blockchain 110 as a transaction event, the blockchain processors validate the authenticity of genesis transaction 220 by checking its digital signature (e.g., with certificate authority 106), and once validated, genesis transaction 220 is added to blockchain 110, and device 108 transitions to ReadyForUse state 208. That is, genesis transaction 220 renders a new device available to configure for use.

In ReadyForUse state 208, device 108 is ready to be utilized (e.g., by provider subsystem 102) and made available to be directly, or preliminarily, associated with a person (e.g., personal identification unit 104), and a determination is made whether device 108 is ready for direct association with a person (e.g., step S122). If the determination is made that device 108 is ready to be associated with a person, a Primary Association transaction 222 is generated, and device 108 is then transitioned from ReadyForUse state 208 to AssociationWithPerson state 210. Primary Association transaction 222 is then submitted to blockchain 110 as a transaction event to confirm the association (e.g., step S122) of device 108 with personal identification unit 104. The processors of blockchain 110 validate Primary Association transaction 222 by checking the current status of device 108 that has been recorded on blockchain 110, as well as the transaction authenticity using digital signatures. Once validated, Primary Association transaction 222 is added to the blockchain (e.g., as a new block in the chain, or a secure entry in the distributed ledger).

In AssociationWithPerson state 210, details associated with use of device 108 are recorded, including without limitation, dates, times, locations, associated person(s), configurations or sub-states, interruptions in the security of the communication, reputation, associated trusted parties, etc., and thus each of these details may be securely recorded in the immutable digital ledger 110. In some embodiments, any change in these details or sub-states may be submitted to blockchain 110 as separate, individual transaction events (not shown), and validated by the blockchain processors in a manner similar to the validation of Primary Association transaction 222. After validation of a new individual transaction events, blockchain 110 will then contain a record of the change details or sub-states within AssociationWithPerson state 210.

Referring back to ReadyForUse state 208, if the determination is made that device 108 is not ready to be directly associated with, and used by, a person, a Potential Use transaction 224 is optionally generated, and device 108 is then transitioned from ReadyForUse state 208 to PreliminaryAssociation state 212. Potential Use transaction 224 is then submitted to blockchain 110 as a transaction event to indicate that device 108 has been configured for association with a person, but has not yet been associated therewith. For example, in the exemplary embodiment illustrated in FIG. 1, device 108 may be set to PreliminaryAssociation state 212 upon completion of step S118, where device what a weight is associated with provider subsystem 102, but before completion of step S122, with the subsequent Association of device 108 with personal identification unit 104 may be confirmed. Blockchain 110 then validates potential use transaction 224 in a manner similar to that described above with respect to Primary Association transaction 222, and once validated, adds the transaction to the ledger. In the exemplary embodiment, PreliminaryAssociation state 212 records details of device 108 that are similar to those described above with respect to AssociationWithPerson state 210, and any changes thereto may similarly be submitted to blockchain 110 as separate transaction events, individually validated, and added to the ledger.

While in PreliminaryAssociation state 212, a determination is made (e.g., after a predetermined amount of time, or by another selected parameter) whether device 108 is to be associated with a person (e.g., step S122). If the determination is made that device 108 is ready to be associated with a person, a Secondary Association transaction 226 is generated, and device 108 is then transitioned from PreliminaryAssociation state 212 to AssociationWithPerson state 210. Secondary Association transaction 226 is then submitted to blockchain 110 as a transaction event to confirm the association (e.g., step S122) of device 108 with personal identification unit 104. Blockchain 110 then validates Secondary Association transaction 226, and adds Secondary Association transaction 226 to the in a manner similar to that described above with respect to Primary Association transaction 222.

While in PreliminaryAssociation state 212, if the determination is made that device 108 is not ready to be associated with/used by a person, an Unused transaction 228 is generated, and device 108 transitions from PreliminaryAssociation state 212 to SterilizationOrReset state 214, and Unused transaction 228 is submitted to blockchain 110 as a transaction event to indicate that device 108 has been placed into a reconditioning or reset configuration. Blockchain 110 then validates Unused transaction 228 in a manner similar to that described above with respect to Primary Association transaction 222, and once validated, adds the transaction to the ledger.

In SterilizationOrReset state 214, a determination is made whether device 108 may be reused, that is, associated with another person. Many electronic medical devices, for example, are manufactured as single-use or disposable devices, and often subject to specific regulations to prevent re-use, refurbishment, or recycling. Accordingly, if the determination is made that device 108 is reusable, a Reprovisioning transaction 230 is generated, which may include details regarding the requirements to reset device 108 to a configuration similar to ReadyToOnboard state 206, as well as the completion of these reset requirements, all of which may be encoded into the transaction. In the case of medical devices, the reset requirements may include details regarding sterilization procedures and/or other refurbishment details, such as battery replacement. Device 108 then transitions from SterilizationOrReset state 214 back to ReadyForUse state 208. Reprovisioning transaction 230 is then submitted to blockchain 110 as a transaction event to indicate that device 108 is again ready for use and association with a person. Blockchain 110 validates Reprovisioning transaction 230 in a manner similar to that described above, and adds the transaction to the ledger.

While in SterilizationOrReset state, if the determination is made that device 108 may not be reused, an Unusable transaction 232 is generated, and device 108 transitions from SterilizationOrReset state 214 to Destruct state 218. Unusable transaction 232 is then submitted to blockchain 110 as a transaction event to indicate that no further transaction events are to occur with respect to device 108. Blockchain 110 validates Unusable transaction to 232 in a manner similar to that described above, and adds the transaction to the ledger.

The transition to Destruct state 218 renders further transactions on blockchain 110 impossible. However, rendering of device 108 into Destruct state 218 does not remove transactions or entries from blockchain 110, even in the event of physical destruction of device 108. In an exemplary embodiment, Destruct state 218 is validated and recorded on blockchain 110 as a final transaction event that includes any additional details that are appropriate to permanently retain regarding device 108, and which may be encoded in this final transaction event.

Referring back to AssociationWithPerson state 210, when the person associated with device 108 no longer desires to use the device, or when device 108 is no longer needed, a Disassociation transaction 234 is generated, which transitions device 108 from AssociationWithPerson state 210 to DissassociationWithPerson state 216. Disassociation transaction 234 is submitted to blockchain 110 as a transaction event to indicate that device 108 it is no longer associated with personal identification unit 104, and blockchain 110 validates the transaction and adds it to the ledger in a manner similar to that described above. In the exemplary embodiment, Disassociation transaction 234 encodes relevant and/or appropriate details of device 108, such as the date, the time, the location, the person from whom the device is disassociated, configuration or sub-states, device usage amounts, associating trusted party, etc.

In DissassociationWithPerson state 216, a determination is made whether device 108 is reusable, or whether device 108 should be disposed of. If the determination is made that device 108 is reusable, a Return transaction 236 is generated, and device 108 transitions from DissassociationWithPerson state 216 to SterilizationOrReset state 214. Return transaction 236 is then submitted to blockchain 110, validated, and added to the ledger as described above. If though, in DissassociationWithPerson state 216, the determination is made that device 108 must be disposed of, a Destroy transaction 238 is generated, and device 108 transition from DissassociationWithPerson state 216 to Destruct state 218. Destroy transaction 238 is then alternatively submitted to blockchain 110, validated, and added to the ledger.

In some cases, while in ReadyForUse state 208, device 108 may expire (e.g., shelf life, battery expiration, etc.), or otherwise become unusable (e.g., excessive wear and tear, damage to electronics from sterilization procedures using Gamma beam or E-beam sterilization, loss of battery life/function from autoclave processes, and/or determinations during reconditioning that the device is no longer suitable for use), and Expired transaction 240 is generated, and device 108 transitions from ReadyForUse state 208 to Destruct state 218. Expired transaction 240 is submitted to blockchain 110, along with encoded details relevant to the transaction, as described above. Blockchain validates expired transaction 240 and adds it to the ledger in the manner described above. In an exemplary embodiment, Expired transaction 240 further functions as a replacement transaction which may be used to automatically order a replacement for device 108, where applicable.

The embodiments described herein implement distributed ledger technology, but are not limited solely to blockchains. Although a blockchain is theoretically perpetual, at a fundamental level, the notion that a particular blockchain is eternally viable (or even viable for many decades or longer) may not be a reasonable assumption, even as the technology continues to improve. Furthermore, it is an unlikely expectation that all transactions within a blockchain will also stand on a queue or list indefinitely. Accordingly, it is contemplated herein that the systems and methods the present embodiments may further implement recovery and/or damage containment mechanisms to mitigate the effects of corruption of a monolithic blockchain or of a blockchain forest.

In the exemplary embodiments described above, blockchain virtualization is illustrated to use a registration model. Centralization achieved according to the registration model advantageously provides both stability and predictability to a blockchain ecosystem. In an alternative embodiment, a consensus model can be applied to the embodiments described above instead of the registration model, in order to provide additional security to the ecosystem. According to the consensus model alternative, particular participant roles within the distributed ledger network may be integrated in two processors, which are thereby capable of negotiating participation and fulfillment operations collectively, utilizing either another blockchain (e.g., a management blockchain), or a consensus driven database (such as Cassandra).

In some embodiments, the security of new blockchains may be improved by including a blockchain hash from another chain, either from within the blockchain forest, or from an independent blockchain (such as Bitcoin). The hash may be included as part of the archival process, or can also be included prior to archival from within the lifecycle of a blockchain. Accordingly, milestones of one blockchain may then be communicated and distributed to other blockchains as transactions. These new transactions can be performed at defined time intervals, at defined block heights (e.g., as part of instantiation and/or user request requirements), or associated with other activity within a blockchain forest (e.g., when another blockchain is instantiated or destroyed). An additional blockchain forest mechanism may serve to advantageously create a lattice of blockchains that is more secure than conventional monolithic implementations because adversaries of the blockchain are now required to attack multiple blockchains to perform a history attack, for example.

As described above, blockchain virtualization advantageously realizes the ability to create blockchains as necessary, and terminate such blockchains (e.g., Destruct state 218) in a straightforward manner when they are no longer needed. In contrast, conventional monolithic blockchains have been known to grow in an unbounded manner. After years of operation, the height of such conventional blockchains, their number of unspent transactions, their network performance of the consensus pool, etc. have been seen to grow to the point that the blockchain does not perform well. Other blockchains may be less successful, and have a small number of participants. Where blockchain virtualization allows conventional blockchains to operate collectively, systems and methods according to the present embodiments may further advantageously realize the ability to terminate corrupted blockchains that are no longer useful, while improving the security of blockchains having a smaller number of participants.

In conventional blockchain implementations, security and scalability improvements tend to result in trade-offs against performance. Through blockchain virtualization though, a blockchain forest need only utilize only the resources necessary to achieve particular security goals of a specific blockchain use case. By operating collectively in a blockchain forest, processors of many different types (e.g., CPU, GPU, FPGA, or ASIC-based processors, etc.) are able to advantageously participate as necessary to support blockchain implementations for which they are optimal (e.g., according to cryptographic computational complexity, consensus approach, etc.).

Irrespective of the particular architecture/methodology of the blockchain, or of the distributed ledger, systems and methods according to the present embodiments realize still further advantages over conventional person-to-device association systems and techniques. In one example, where federal regulations exist that prevent single-use medical devices from being lawfully refurbished, reconditioned, or otherwise reused, a black market nevertheless exists for selling such disposed of devices for repeated use, both within this country, and in foreign jurisdictions. Such repeated usage can present significant dangers to medical patients who are unable to verify whether a biologically-implemented electronic device was lawfully obtained, and subject to sterilization and refurbishment procedures, if lawful. Through the several advantageous techniques of the present embodiments, an attempt to recondition a device in the Destruct state (e.g., destruct state 218, FIG. 2) might, based on available prior transaction details from the original blockchain, alert potential users of the illicit device when a party attempts to set the device into a ReadyForUse state (e.g., state 208, FIG. 2).

Even in cases where federal regulations lawfully allow the reuse of medical devices (e.g., properly conditioned, reset, and/or sterilized), embodiments according to the present systems and methods have still further advantage that new potential users, or buyers of the devices, may more reliably verify prior use of the device, and also whether the device has recorded the necessary steps required to reset/refurbish the device to the appropriate near-new condition.

In a similar manner, the present embodiments are further useful for other areas of technology, and more particularly with regard to tracking association and use weapons (e.g., firearms or tasers, which were frequently now include cameras and other recording ability when the weapon is discharged, as well as biometric scanner capability that can more accurately identify the particular person associated with the device at the time of use/discharge. The present systems and methods may also be implemented to advantageously track vehicles, dash-cams within a vehicle, or body-cams worn by law enforcement personnel. The present systems and methods allow reliable record to be consulted to track usage of particular objects such that an accurate chain-of-title may be established for the particular device, or such that the device may be more readily located if stolen. In particular cases, where devices are intended for physical destruction, the present systems and methods still further advantageously allow for easier identification and location of such devices when they instead appear back on the market in contravention of the law, whether due to simple theft, or insurance fraud purposes Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An association management system for establishing, maintaining, and monitoring associations between a personal identifier and an electronic device, comprising:
    a provider subsystem in operable communication with at least one of the personal identifier and the electronic device, the provider subsystem configured to provision a person associated with the personal identifier, authenticate both of the personal identifier and the electronic device, and establish an association of the authenticated personal identifier to the authenticated electronic device;
    a certificate authority subsystem for issuing at least one digital certificate to verify an identity of one or more digital entities operating on the management system; and
    a digital distributed ledger including a plurality of participating processors comprising a consensus pool,
    wherein the digital distributed ledger is configured to verify, using the at least one digital certificate, transaction events of the association management system, and
    wherein the verified transaction events include (i) provisioning of the personal identifier, (ii) authentication of the personal identifier by the certificate authority, (iii) authentication of the electronic device, and (iv) association of the authenticated personal identifier with the authenticated electronic device.

2. The system of claim 1, wherein the digital distributed ledger is further configured to monitor the association of the authenticated personal identifier to the authenticated electronic device.

3. The system of claim 2, wherein the provider subsystem is further configured to establish a secure communication channel over which the association is maintained, and wherein the digital distributed ledger is further configured to monitor an operation of the secure communication channel.

4. The system of claim 3, wherein the digital distributed ledger is further configured to, upon experiencing a disruption to the secure communication channel or the association, re-verify the respective identities and authentications of the personal identifier and the electronic device prior to verifying a re-association of the personal identifier to the electronic device.

5. The system of claim 1, wherein the digital distributed ledger comprises a blockchain, and wherein the blockchain is configured to record the verified transaction events as immutable block entries on the blockchain.

6. The system of claim 5, wherein the blockchain is configured to verify the transaction events using a consensus pool of distributed electronic processors participating in an electronic communication network of the association management system.

7. The system of claim 5, wherein the blockchain is configured to implement one of consensus model and a registration model.

8. The system of claim 5, wherein one or more of the provider subsystem, the personal identifier, the electronic device, the certificate authority subsystem, and the blockchain is configured to communicate with at least one node of an electronic communications network.

9. The system of claim 1, wherein the certificate authority subsystem is configured to issue the at least one digital certificate according to a secure public key infrastructure (PKI) technique.

10. The system of claim 1, wherein the provider subsystem comprises an electronic computer network of one of a medical facility, a law enforcement central office, and a fleet vehicle distribution center.

11. The system of claim 10, wherein the electronic device comprises at least one of a medical device, a body camera, a vehicle dashboard camera, a firearm or taser, and an automobile.

12. The system of claim 1, wherein the personal identifier comprises one or more of a trackable biometric identifier, a trackable ID unit, an RFID tag, a barcoded wristband or tag, a biometric electronic device, a geo.Chip, a GPS electronic device, and tag configured to utilize near field communication (NFC) technology, and wherein the authentication of the personal identifier comprises hashing encoded data of the personal identifier with a digital signature.

13. A method of establishing and managing an association of an electronic device to a person, the method implementing an electronic certificate authority and a digital distributed ledger having a plurality of participating processors over a distributed network, the method comprising the steps of:
  initiating a digitally signed genesis transaction for the electronic device to the plurality of participating processors for consensus verification, the consensus verification comprising validating a digital signature of the genesis transaction with the certificate authority;
  configuring, after consensus verification of the genesis block transaction, the electronic device to have a status indicating availability of the configured device for use;
  provisioning a personal identifier to a person and validating the provisioned personal identifier with the digital signature from the certificate authority to generate an authenticated personal identifier;
  associating the available electronic device with the authenticated personal identifier, wherein the association comprises validation, by the participating processors checking the digital signature with the electronic certificate authority, of the availability status of the configured device;
  recording, onto the digital distributed ledger, operational details of the association of the available electronic device with the authenticated personal identifier;
  monitoring a use of the associated electronic device over time, wherein the monitoring comprises tracking changes to one or more of the operational details of the association; and
  validating, by the participating processors checking the digital signature with the electronic certificate authority, a change to the one or more operational parameters, and recording information of the change on the digital distributed ledger.

14. A method of establishing and managing an association of an electronic device to a person, the method implementing an electronic certificate authority and a digital distributed ledger having a plurality of participating processors over a distributed network, the method comprising the steps of:
  initiating a digitally signed genesis transaction for the electronic device to the plurality of participating processors for consensus verification, the consensus verification comprising validating a digital signature of the genesis transaction with the certificate authority;
  configuring, after consensus verification of the genesis block transaction, the electronic device to have a status indicating availability of the configured device for use;
  associating the available electronic device with a personal identifier of the person, wherein the association comprises validation, by the participating processors checking the digital signature with the electronic certificate authority, of the availability status of the configured device;
  recording, onto the digital distributed ledger, operational details of the association of the available electronic device with the personal identifier;
  monitoring a use of the associated electronic device over time, wherein the monitoring comprises tracking changes to one or more of the operational details of the association; and
  validating, by the participating processors checking the digital signature with the electronic certificate authority, a change to the one or more operational parameters, and recording information of the change on the digital distributed ledger; and
  disassociating the electronic device from the personal identifier, wherein operational details of the step of disassociating are validated by the plurality of processors and recorded on the digital distributed ledger.

15. The method of claim 13, further comprising, prior to the step of associating, a preliminary association step indicating authentication of the electronic device by the certificate authority prior to association with the personal authenticated identifier, wherein operational details of the preliminary association step are validated by the plurality of processors and recorded on the digital distributed ledger.

16. The method of claim 13, further comprising a step of reconditioning the electronic device when the electronic device is not associated with the authenticated personal identifier, wherein operational details of the step of reconditioning are validated by the plurality of processors and recorded on the digital distributed ledger.

17. The method of claim 16, further comprising, after the step of reconditioning, a step of re-provisioning the electronic device for a new use and association with a person, wherein operational details of the step of re-provisioning are validated by the plurality of processors and recorded on the digital distributed ledger.

18. The method of claim 16, further comprising a step of destroying the electronic device,
  wherein the step of destroying occurs after one or more of (i) expiration of or damage to the electronic device while the electronic device is available for use, (ii) expiration of or damage to the electronic device after reconditioning, and (iii) disassociation of the electronic device from a person when the device is provisioned for single-use,
  wherein operational details of the step of destroying are validated by the plurality of processors and recorded on the digital distributed ledger, and
  wherein validation of the step of destroying prevents further transactions from being recorded on the digital distributed ledger regarding the electronic device.

19. The method of claim 16, wherein the digital distributed ledger comprises a blockchain, and wherein the steps of recording comprise adding respective validated blocks to the blockchain.

* * * * *